UNITED STATES PATENT OFFICE.

HENRY HOWARD, OF BROOKLINE, AND FRANK G. STANTIAL, OF MELROSE, MASSACHUSETTS.

METHOD OF RECOVERING SULFUR DIOXID FROM FURNACE-GASES.

1,271,899.              Specification of Letters Patent.           Patented July 9, 1918.

No Drawing.        Application filed May 12, 1917.    Serial No. 168,276.

*To all whom it may concern:*

Be it known that we (1) HENRY HOWARD, and (2) FRANK G. STANTIAL, citizens of the United States, residing at (1) Brookline, (2) Melrose, in the counties of (1) Norfolk, (2) Middlesex, and State of (1) Massachusetts, (2) Massachusetts, have invented certain new and useful Improvements in Methods of Recovering Sulfur Dioxid from Furnace-Gases, of which the following is a specification.

It is well known that great difficulties are encountered in the removal of sulfur dioxid from furnace gases, and particularly from such gases as contain only small proportions of sulfur dioxid, largely diluted by air and carbon dioxid. Scrubbing with water, even in large volume, produces very little effect upon such gases. Absorption by milk of lime is difficult, as the apparatus soon becomes clogged with insoluble calcium sulfite, which forms very hard, dense, crystalline masses. The latter operation is moreover inefficient, owing to the slight solubility of the calcium carbonate which is first formed by the large excess of carbon dioxid present in the gases.

The present invention comprises a simple method, cyclical in character, whereby such dilute gas-mixtures are effectively scrubbed. For example, the gases from a Dwight & Lloyd sintering machine working upon a material of low sulfur-content, such as pyrites cinder, these gases containing about 0.75 per cent. of $SO_2$, may be quickly and easily brought to an $SO_2$ content not exceeding 0.10 to 0.15 per cent., which percentages are not sufficiently high to be objectionable.

According to our invention in its preferred embodiment, the furnace gases are first subjected to any suitable treatment for the removal of dust, or of dust and sulfur trioxid in case the latter is present to any material extent. Both of these objects may be attained by subjecting the gases to the known processes of electrical precipitation at a temperature below that at which sulfur trioxid exists as a gas. The partially purified gas-mixture is then brought into contact in a scrubbing tower or other absorption apparatus with a dilute solution of alkali, a 2½ per cent. solution of sodium carbonate being suitable. A similar solution of caustic soda is equivalent for the purpose, being converted into carbonate or bicarbonate by the carbon dioxid of the gases. This scrubbing operation effectually removes the greater part of the sulfur dioxid, yielding a harmless exit gas and a dilute solution of sodium sulfite. The reaction may conveniently be represented by the well known equation:—

$$Na_2CO_3 + SO_2 = Na_2SO_3 + CO_2$$

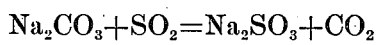

In case some excess of sulfur dioxid is permitted to traverse the absorption apparatus, a corresponding proportion of sodium bisulfite ($NaHSO_3$) will be formed. Both of these compounds are embraced within the term "sodium sulfite" as used herein.

The dilute solution of sodium sulfite leaving the absorption apparatus is causticized by lime, being treated for this purpose with milk of lime in proper proportion to precipitate calcium sulfite. This causticizing reaction may proceed in accordance with the equation—

$$Na_2SO_3 + Ca(OH)_2 = CaSO_3 + 2NaOH;$$

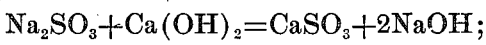

or to the extent that sodium bisulfite may be present,—

$$NaHSO_3 + Ca(OH)_2 = CaSO_3 + NaOH + H_2O.$$

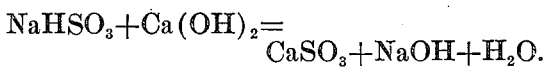

This results in the recovery of the sulfur dioxid as insoluble calcium sulfite, the quantity of alkali required being sufficient only to make up unavoidable losses.

In case of gases free from sulfur trioxid, or gases which have been freed from sulfur trioxid, as above mentioned, these losses arise from mechanical sources only. If however any substantial quantity of sulfur trioxid were permitted to pass into the absorption apparatus, a corresponding loss of alkali, as sodium sulfate, would be involved.

The calcium sulfite produced as above can be used by the sulfite pulp manufacturer in place of lime, thereby replacing his lime and saving about one-half of his sulfur. The material may be shipped in the form of dry calcium sulfite, which will stand the expense of freight transportation to considerable distances.

We claim:—

1. A cyclical method of recovering sulfur dioxid from furnace gases, comprising scrubbing the gases with a dilute solution of alkali, thereby producing an alkali sulfite, causticizing said sulfite by lime to produce calcium sulfite and regenerate an alkali solution, and re-using the regenerated alkali solution in the operating cycle.

2. A cyclical method of recovering sulfur dioxid from furnace gases containing also sulfur trioxid, comprising precipitating non-gaseous substances, including sulfur trioxid, from the gas-stream, scrubbing the residual gas-mixture with a dilute solution of alkali, thereby producing an alkali sulfite, causticizing said sulfite by lime to produce calcium sulfite and regenerate an alkali solution, and re-using the regenerated alkali solution in the operating cycle.

3. A cyclical method of recovering sulfur dioxid from furnace gases containing also sulfur trioxid, comprising removing sulfur trioxid from the gases, scrubbing the residual gas-mixture with a dilute solution of alkali, thereby producing an alkali sulfite, causticizing said sulfite by lime to produce calcium sulfite and regenerate an alkali solution, and re-using the regenerated alkali solution in the operating cycle.

In testimony whereof, we affix our signatures.

HENRY HOWARD.
FRANK G. STANTIAL.